United States Patent
Park et al.

(10) Patent No.: US 10,737,472 B2
(45) Date of Patent: Aug. 11, 2020

(54) ACRYLIC MULTILAYERED FILM WITH HIGH WEATHER RESISTANCE, AND PREPARATION METHOD THEREOF

(71) Applicant: LG Hausys, Ltd., Seoul (KR)

(72) Inventors: Hwan Seok Park, Anyang-si (KR); Chang Hak Shin, Seoul (KR); Seong Hoon Yue, Seongnam-si (KR); Jong Hun Lee, Seongnam-si (KR); Ku Il Park, Yongin-si (KR); Deok Ryul Hwang, Seoul (KR); Yea Ri Song, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 1197 days.

(21) Appl. No.: 14/427,464

(22) PCT Filed: Sep. 9, 2013

(86) PCT No.: PCT/KR2013/008099
§ 371 (c)(1),
(2) Date: Mar. 11, 2015

(87) PCT Pub. No.: WO2014/042394
PCT Pub. Date: Mar. 20, 2014

(65) Prior Publication Data
US 2015/0210046 A1 Jul. 30, 2015

(30) Foreign Application Priority Data
Sep. 12, 2012 (KR) .......................... 10-2012-0100842

(51) Int. Cl.
B32B 27/08 (2006.01)
B32B 27/30 (2006.01)
(Continued)

(52) U.S. Cl.
CPC .............. *B32B 27/08* (2013.01); *B29C 48/21* (2019.02); *B32B 25/14* (2013.01); *B32B 27/30* (2013.01);
(Continued)

(58) Field of Classification Search
None
See application file for complete search history.

(56) References Cited

U.S. PATENT DOCUMENTS 2,949,445 A * 8/1960 Blake ................. C08G 59/3209
524/361
3,301,919 A * 1/1967 Cenci .................... C08F 220/14
525/208
(Continued)

FOREIGN PATENT DOCUMENTS

| CN | 1475525 A | 2/2004 |
|---|---|---|
| KR | 20040061009 A | 7/2004 |

(Continued)

OTHER PUBLICATIONS

International Search Report for PCT/KR2013/008099 dated Dec. 6, 2013.
(Continued)

*Primary Examiner* — Callie E Shosho
*Assistant Examiner* — Patrick N English
(74) *Attorney, Agent, or Firm* — Hauptman Ham, LLP

(57) ABSTRACT

Provided is an acrylic multilayered film with high weather resistance, comprising an upper film and a lower film, wherein the upper film comprises a polyvinylidene fluoride and a first acrylic copolymer containing a first functional group, and the lower film comprises an acrylic thermoplastic resin and a second acrylic copolymer containing a second functional group.

11 Claims, 1 Drawing Sheet

(51) Int. Cl.
    *B29C 47/06*     (2006.01)
    *B29C 48/21*     (2019.01)
    *B32B 25/14*     (2006.01)
    *B32B 27/38*     (2006.01)
    *B29K 27/00*     (2006.01)
    *B29K 33/00*     (2006.01)
    *B29K 105/00*    (2006.01)

(52) U.S. Cl.
    CPC .......... *B32B 27/304* (2013.01); *B32B 27/308* (2013.01); *B32B 27/38* (2013.01); *B29K 2027/16* (2013.01); *B29K 2033/08* (2013.01); *B29K 2033/12* (2013.01); *B29K 2105/0005* (2013.01); *B29K 2105/0044* (2013.01); *B29K 2105/0085* (2013.01); *B32B 2250/02* (2013.01); *B32B 2270/00* (2013.01); *B32B 2307/71* (2013.01); *B32B 2307/712* (2013.01); *B32B 2419/00* (2013.01); *Y10T 428/3154* (2015.04); *Y10T 428/31511* (2015.04)

(56) References Cited

U.S. PATENT DOCUMENTS

| | | | |
|---|---|---|---|
| 4,226,904 A | 10/1980 | Ollivier et al. | |
| 6,811,859 B2 | 11/2004 | Bonnet et al. | |
| 2004/0137252 A1* | 7/2004 | Bonnet | B32B 27/08 428/500 |
| 2008/0293837 A1 | 11/2008 | Toft et al. | |
| 2010/0189983 A1* | 7/2010 | Numrich | B29C 47/065 428/220 |
| 2012/0024353 A1* | 2/2012 | Ge | B32B 7/12 136/251 |

FOREIGN PATENT DOCUMENTS

| | | |
|---|---|---|
| KR | 20060016853 A | 2/2006 |
| KR | 20060134922 A | 12/2006 |
| KR | 20100040864 A | 4/2010 |
| KR | 20110007252 A | 1/2011 |
| KR | 20110009223 A | 1/2011 |
| KR | 20120050381 A | 5/2012 |
| KR | 20120052947 A | 5/2012 |
| KR | 20120056974 A | 6/2012 |

OTHER PUBLICATIONS

Extended European Search Report dated Jul. 28, 2015 in connection with the European Patent Application No. 13836807.1.
Chinese Office Action dated Mar. 3, 2016 corresponding to Chinese Application No. 201380047657.7.

* cited by examiner

ACRYLIC MULTILAYERED FILM WITH HIGH WEATHER RESISTANCE, AND PREPARATION METHOD THEREOF

CROSS REFERENCE TO RELATED APPLICATION

This application claims the priority of Korean Patent Application No. 10-2012-0100842 filed on Sep. 12, 2012 in the Korean Patent and Trademark Office. Further, this application is the National Phase application of International Application No. PCT/KR2013/008099 filed on Sep. 9, 2013, which is incorporated herein by reference in its entirety.

TECHNICAL FIELD

The present invention relates to a highly weather resistant acrylic multilayer film and a method for manufacturing the same.

BACKGROUND ART

Weather resistant films are used for various purposes in decorative construction materials. In particular, the weather resistant films are widely used for building exteriors where weather resistance is important. Currently, although the weather resistant films are mainly acrylic films, an attempt to introduce a fluorine resin into an upper layer is being made with increasing demand for weather resistance.

KR 2011-0007252 discloses a fluorine resin-stacked acrylic resin film for interiors and exteriors of vehicles, U.S. 2008/0293837 discloses an acrylic resin composition including PMMA/impact modifier/PVDF as main components, and U.S. 2010/0189983 discloses a highly weather resistant film using a polymerizable UV stabilizer and PMMA/PVDF.

Such various attempts are aimed at improving weather resistance of an overall film using excellent weather resistance of PVDF. In addition, due to high price of PVDF, it is extremely important to maximize capabilities of the film with a minimized amount of PVDF. To achieve this, coextrusion is mainly used.

An A/B type coextruded film is mainly used. In a lot of cases, an upper film is composed of a PVDF single layer or a PVDF/PMMA blend, and a lower film is composed of a PMMA/impact modifier blend. However, although known to exhibit compatibility, the PMMA/PVDF blend is known as having some limits in transparency, adhesion and the like due to crystallization properties of PVDF.

DISCLOSURE

Technical Problem

It is one aspect of the present invention to provide a highly weather resistant acrylic multilayer film which exhibits improved compatibility and transmittance, can realize excellent appearance and stretching properties, and exhibits excellent workability in post-processing such as lamination, profiling, and the like.

It is another aspect of the present invention to provide a method for manufacturing the highly weather resistant acrylic multilayer film as set forth above.

Technical Solution

In accordance with one aspect of the present invention, a highly weather resistant acrylic multilayer film includes an upper film and a lower film, wherein the upper film includes polyvinylidene fluoride and a first functional group-containing first acrylic copolymer, and the lower film includes an acrylic thermoplastic resin and a second functional group-containing second acrylic copolymer.

The first functional group and the second functional group may be each independently one selected from the group consisting of epoxy, carboxylic, hydroxyl groups, and combinations thereof.

The first functional group-containing first acrylic copolymer and the second functional group-containing second acrylic copolymer may each independently include a structural unit which is derived from one selected from the group consisting of glycidyl methacrylate, carboxylic acrylate, carboxylic methacrylate, 2-hydroxyethyl acrylate, 2-hydroxypropyl acrylate, 2-hydroxyethyl methacrylate, 2-hydroxypropyl methacrylate, and combinations thereof.

The first functional group-containing first acrylic copolymer and the second functional group-containing second acrylic copolymer may be formed by copolymerization of a polymerizable acrylic monomer mixture, and the polymerizable acrylic monomer mixture may include about 0.5% by weight (wt %) to about 5 wt % of a first functional group-containing acrylic monomer or a second functional group-containing acrylic monomer.

The polymerizable acrylic monomer mixture may further include one selected from the group consisting of an acrylate, a methacrylate and combinations thereof, and the acrylate and the methacrylate may be unsubstituted or substituted with a $C_1$ to $C_4$ alkyl group.

The polymerizable acrylic monomer mixture may include about 5 wt % to about 20 wt % of an acrylic monomer and about 75 wt % to about 94.5 wt % of a methacrylic monomer.

The polymerizable acrylic monomer mixture may include about 0.5 wt % to about 5.0 wt % of an epoxy methacrylate, about 5 wt % to about 20 wt % of methyl acrylate, and about 75 wt % to about 94.5 wt % of methyl methacrylate.

The first functional group-containing first acrylic copolymer may have a weight average molecular weight of about 70,000 to about 120,000.

The second functional group-containing second acrylic copolymer may have a weight average molecular weight of about 90,000 to about 150,000.

The upper film may include about 60 wt % to about 95 wt % of polyvinylidene fluoride and about 5 wt % to about 40 wt % of the first functional group-containing first acrylic copolymer.

The lower film may further include an impact modifier.

The lower film may include about 20 wt % to about 50 wt % of the acrylic thermoplastic resin, about 40 wt % to about 60 wt % of the second functional group-containing second acrylic copolymer, and about 10 wt % to about 30 wt % of the impact modifier.

The impact modifier may be an acrylic rubber copolymer.

The lower film may further include one additive selected from the group consisting of a UV stabilizer, an antioxidant, a lubricant, and combinations thereof.

The lower film may include about 1.5 phr to about 5 phr of the UV stabilizer.

In accordance with another aspect of the present invention, a method for manufacturing a highly weather resistant acrylic multilayer film includes forming a highly weather resistant acrylic multilayer film by coextrusion so as to form the upper and lower films of the highly weather resistant acrylic multilayer film as set forth above.

Advantageous Effects

The highly weather resistant acrylic multilayer film can realize excellent light transmittance, appearance and stretching properties, and exhibits excellent workability in post-processing such as lamination, profiling and the like.

BEST MODE

Figure 1:
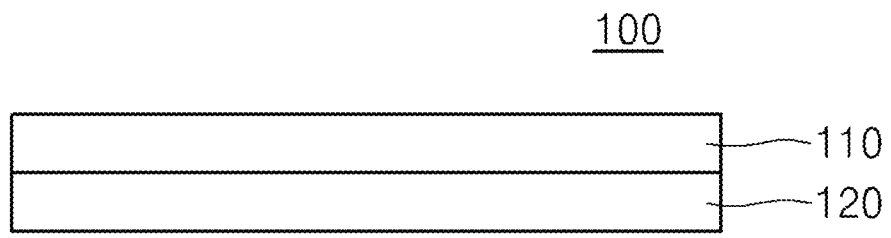
FIG. 1 is schematic sectional view of a highly weather resistant acrylic multilayer film according to one embodiment of the present invention.

Hereinafter, embodiments of the present invention will be described in detail with reference to the accompanying drawings. It should be understood that the following embodiments are provided for illustration only and are not to be construed in any way as limiting the present invention. The scope of the present invention should be defined only by the accompanying claims and equivalents thereof.

In the drawings, the thicknesses of various layers and regions are enlarged for clarity. In addition, the thicknesses of some layers and regions are exaggerated for convenience.

It will be understood that when an element such as a layer, film, region or substrate is referred to as being placed "on (or under)" another element, it can be directly placed on (or under) the other element, or intervening layer(s) may also be present.

In accordance with one aspect of the present invention, a highly weather resistant acrylic multilayer film includes an upper film and a lower film, wherein the upper film includes polyvinylidene fluoride (PVDF) and a first functional group-containing first acrylic copolymer, and the lower film includes an acrylic thermoplastic resin and a second functional group-containing second acrylic copolymer.

In the [PVDF/acrylic thermoplastic resin] multilayer structure film, both the upper and lower films are mixed with a functional group-containing acrylic copolymer, thereby improving compatibility and transmittance of the highly weather resistant acrylic multilayer film exhibits. In addition, the highly weather resistant acrylic multilayer film can realize excellent appearance and stretching properties, and exhibits excellent workability in post-processing such as lamination, profiling and the like.

The multilayer structure may be manufactured by coextrusion. Coextrusion may be performed under any conditions and may be performed by typical film compression known in the art. The highly weather resistant acrylic multilayer film may be stacked to protect a print layer designed on an opaque sheet such as PVC, PMMA and the like. Here, the highly weather resistant acrylic multilayer film is extremely useful due to excellent transparency thereof.

FIG. 1 is a sectional view of a highly weather resistant acrylic multilayer film 100 according to one embodiment of the present invention, which has a multilayer structure in which an upper film 110 and a lower film 120 are stacked.

In relation to the functional group-containing acrylic copolymer throughout the specification, for convenience' sake, the functional group-containing acrylic copolymer included in the upper film will be referred to as the first functional group-containing first acrylic copolymer, and the functional group-containing acrylic copolymer included in the lower film will be referred to as the second functional group-containing second acrylic copolymer. In addition, details of the functional group-containing acrylic copolymer are applied to both the first functional group-containing first acrylic copolymer and the second functional group-containing second acrylic copolymer.

The functional group of the functional group-containing acrylic copolymer may include one selected from the group consisting of epoxy, carboxyl, hydroxyl groups, and combinations thereof.

Specifically, the functional group-containing acrylic copolymer may include a structural unit which is derived from one selected from the group consisting of glycidyl methacrylate, carboxylic acrylate, carboxylic methacrylate, 2-hydroxyethyl acrylate, 2-hydroxypropyl acrylate, 2-hydroxyethyl methacrylate, 2-hydroxypropyl methacrylate, and combinations thereof.

When the highly weather resistant acrylic multilayer film is adjusted in terms of a composition ratio so as to include a functional group in an appropriate amount, the acrylic multilayer film can prevent generation of adverse effects, such as partial crosslinking and the like, which can occur when the acrylic multilayer film includes an excess of the functional group, and thus can exhibit excellent film surface properties.

In one embodiment, the functional group-containing acrylic copolymer may be formed by copolymerization of a polymerizable acrylic monomer mixture, and the functional group-containing acrylic monomer as set forth above may be present in an amount of about 0.5 wt % to about 5 wt % in the polymerizable acrylic monomer mixture.

The polymerizable acrylic monomer mixture may further include one selected from the group consisting of an acrylate, a methacrylate and combinations thereof, and the acrylate and the methacrylate may be unsubstituted or substituted with a $C_1$ to $C_4$ alkyl group.

In another embodiment, the polymerizable acrylic monomer mixture may include about 0.5 wt % to about 5 wt % of the functional group-containing acrylic monomer as set forth above, 5 wt % to 20 wt % of an acrylic monomer, and 75 wt % to 94.5 wt % of a methacrylic monomer.

For example, the polymerizable acrylic monomer mixture may include 0.5 wt % to 5.0 wt % of an epoxy methacrylate, 5 wt % to 20 wt % of methyl acrylate, and 75 wt % to 94.5 wt % of methyl methacrylate.

The functional group-containing acrylic copolymer included in the upper film, that is, the first functional group-containing first acrylic copolymer, may have a weight average molecular weight of about 70,000 to about 120,000. Within this range, the functional group-containing acrylic copolymer can provide properties suitable for film formation.

The functional group-containing acrylic copolymer included in the lower film, that is, the second functional group-containing second acrylic copolymer, may have a weight average molecular weight of about 90,000 to about 150,000. Within this range, the functional group-containing acrylic copolymer can provide properties suitable for film formation.

In one embodiment, the upper film may include about 60 wt % to about 95 wt % of polyvinylidene fluoride and about 5 wt % to about 40 wt % of the first functional group-containing first acrylic copolymer.

The lower film may further include an impact modifier. The impact modifier may be an acrylic rubber copolymer.

Specifically, the impact modifier may be acrylic rubber copolymer particles having a multilayer structure of a core and a shell, and the acrylic rubber copolymer particles may have an average diameter from about 50 nm to about 150 nm. The core may include at least one selected from among a methacrylic acid ester monomer, an aromatic vinyl monomer, a crosslinking agent and an initiator, and the shell of the acrylic rubber copolymer may include at least one selected from among an acrylic acid ester monomer, a methacrylic acid monomer, a chain transfer agent, an initiator and a crosslinking agent. The core may be present in an amount of about 30 wt % to about 50 wt % and the shell may be present in an amount of about 50 wt % to about 70 wt %.

For example, the core of the acrylic rubber copolymer may include 50 wt % to 90 wt % of the methacrylic acid ester monomer and 10 wt % to 50 wt % of the aromatic vinyl monomer in the total monomers, and the shell of the acrylic rubber copolymer may include 10 wt % to 50 wt % of the acrylic acid ester monomer and 50 wt % to 90 wt % of the methacrylic acid monomer in the total monomers.

In another embodiment, the lower film may include about 20 wt % to about 50 wt % of the acrylic thermoplastic resin, about 40 wt % to about 60 wt % of the second functional group-containing second acrylic copolymer, and about 10 wt % to about 30 wt % of the impact modifier.

The acrylic thermoplastic resin may include at least one selected from among an acrylic acid ester monomer, a methacrylic acid ester monomer, a chain transfer agent, and an initiator.

In one embodiment, the acrylic thermoplastic resin may be a resin obtained by copolymerization of a monomer composition including about 10 wt % to about 50 wt % of the acrylic acid ester monomer and about 50 wt % to about 90 wt % of the methacrylic acid ester monomer.

In another embodiment, the acrylic thermoplastic resin may be a polymethylmethacrylate copolymer.

The lower film may further include one additive selected from the group consisting of a UV stabilizer, an antioxidant, a lubricant, and combinations thereof. The kind and amount of additive may be adjusted according to desired properties. For example, the additive may be mixed in an amount of about 2 phr to about 5 phr. In another example, about 1.5 phr to about 5 phr of the UV stabilizer may be used.

The highly weather resistant acrylic multilayer film may be formed to various thicknesses depending upon purposes thereof. In one embodiment, the highly weather resistant acrylic multilayer film may have a thickness from about 40 μm to about 150 μm.

The highly weather resistant acrylic multilayer film may also have various thickness ratios of the upper film to the lower film depending on purposes thereof. In one embodiment, the thickness ratio of the upper film to the lower film ranges from about 0.1:1.0 to about 1.0:1.0 in terms of weather resistance and price of coextruded films.

As described above, the highly weather resistant acrylic multilayer film may be manufactured by an extrusion process known in the art. Specifically, components of each of the upper and lower films may be mixed to be manufactured into pellets via a twin-screw extruder, followed by coextrusion through a film extrusion process, thereby manufacturing the highly weather resistant acrylic multilayer film.

Hereinafter, the present invention will be described in more detail with reference to some examples. It should be understood that these examples are provided for illustration only and are not to be construed in any way as limiting the present invention.

EXAMPLES

Example 1

Polyvinylidene fluoride (PVDF) and a first functional group-containing first acrylic copolymer were mixed to prepare a composition for upper film formation. In addition, a polymethylmethacrylate (PMMA) copolymer, an impact modifier and a second functional group-containing second acrylic copolymer were mixed, followed by addition of a benzotriazole UV absorber, a UV stabilizer such as HALS UV stabilizers and the like, and hindered phenolic and phosphate antioxidants as other additives, thereby preparing a composition for lower film formation.

Each of the composition for upper film formation and the composition for lower film formation was manufactured into pellets at 240° C. via a twin-screw extruder, followed by coextrusion, thereby manufacturing a highly weather resistant acrylic multilayer film including upper and lower films according to mixing constitution as shown in Table 1.

Specifically, compounds used in the composition for upper film formation and the composition for lower film formation are as follows.

PVDF: Kynar 720, Arkema Co., Ltd., MVI 10 cm$^3$/10 min (230° C., 5 kg)

First functional group-containing first acrylic copolymer: A copolymer having a weight average molecular weight of 90,000 and prepared by copolymerization through suspension polymerization of a monomer mixture of 0.5 wt % of glycidyl methacrylate (GMA), 10 wt % of methyl acrylate and 89.5 wt % of methyl methacrylate.

A PMMA copolymer was prepared by the following method:

0.2 parts by weight of octyl mercaptan and 0.1 parts by weight of azobisisobutyronitrile were added and mixed based on 100 parts by weight of a monomer including 85 wt % of methyl methacrylate and 15 wt % of butyl acrylate. Next, the mixture was added to a solution obtained by mixing 0.3(?) of a methacrylic acid dispersant, 1.5 g of sodium hydrogen phosphate as a buffer salt, and 2.0 g of disodium hydrogen phosphate with 250 parts by weight of deionized water, followed by stirring and suspension polymerization, thereby obtaining a PMMA copolymer having a weight average molecular weight of 100,000.

Second functional group-containing second acrylic copolymer: A copolymer having a weight average molecular weight of 100,000 prepared by copolymerization through suspension polymerization of a monomer mixture of 1.0 wt % of glycidyl methacrylate (GMA), 10 wt % of methyl acrylate and 89 wt % of methyl methacrylate.

An impact modifier was prepared by the following method:

250 parts by weight of deionized water, 0.002 parts by weight of ferrous sulfate, 0.008 parts by weight of an EDTA·2 Na salt, 0.2 parts by weight of sodium formaldehyde sulfoxylate and 2 parts by weight of sodium dodecyl sulfate were injected into a reactor equipped with a stirrer, followed by nitrogen substitution, and then heated to 65° C. After heating, 1/10 of a mixed solution including 33 parts by weight of butyl methacrylate, 7 parts by weight of styrene, 1 part by weight of allyl methacrylate and 0.05 parts by weight of cumene hydroperoxide was added dropwise for 30 minutes, followed by dropwise addition of the remaining %10 of the mixed solution for 90 minutes, and then subjected to emulsion polymerization by stirring for 1 hour. Here, an obtained glass-phase polymer had an average diameter of 40 nm. Next, a mixed solution of 0.5 parts by weight of sodium dodecyl sulfate, 6 parts by weight of butyl acrylate, 24 parts by weight of methyl methacrylate, 0.3 parts by weight of allyl methacrylate, 0.04 parts by weight of dodecyl mercaptan and 0.05 parts by weight of cumene hydroperoxide was added dropwise to the polymer for 1 hour, followed by dropwise addition of a mixed solution of 3 parts by weight of butyl acrylate, 27 parts by weight of methyl methacrylate, 0.09 parts by weight of dodecyl mercaptan and 0.05 parts by weight of cumene hydroperoxide for 1 hour, and then subjected to polymerization for 1 hour. A final polymer had an average diameter of 60 nm. An acrylic rubber copolymer corresponding to the final polymer was subjected to aggregation at 70° C. by introduction of 0.02 parts by weight of calcium acetate based on an amount of solid particles. Obtained particle powder was subjected to dehydration in distilled water, followed by drying at 80° C.

Example 2

A highly weather resistant acrylic multilayer film was manufactured in the same manner as in Example 1 except that components and amounts included in each of the upper and lower films and thicknesses of each layer were changed as listed in Table 1, and that each of the first functional group-containing first acrylic copolymer and the second functional group-containing second acrylic copolymer was prepared under the following conditions of monomers and amounts thereof.

First functional group-containing first acrylic copolymer: A copolymer having a weight average molecular weight of 90,000 and prepared by copolymerization through suspension polymerization of a monomer mixture of 3.0 wt % of glycidyl methacrylate (GMA), 10 wt % of methyl acrylate and 87 wt % of methyl methacrylate.

Second functional group-containing second acrylic copolymer: A copolymer having a weight average molecular weight of 100,000 and prepared by copolymerization through suspension polymerization of a monomer mixture of 1.0 wt % of glycidyl methacrylate (GMA), 10 wt % of methyl acrylate and 89 wt % of methyl methacrylate.

Example 3

A highly weather resistant acrylic multilayer film was manufactured in the same manner as in Example 1 except that components and amounts thereof included in each of the upper and lower films and thicknesses of each layer were changed as listed in Table 1, and that each of the first functional group-containing first acrylic copolymer and the second functional group-containing second acrylic copolymer was prepared under the following conditions of monomers and amounts thereof.

First functional group-containing first acrylic copolymer: A copolymer having a weight average molecular weight of 100,000 and prepared by copolymerization through suspension polymerization of a monomer mixture of 5 wt % of glycidyl methacrylate (GMA), 10 wt % of methyl acrylate and 85 wt % of methyl methacrylate.

Second functional group-containing second acrylic copolymer: A copolymer having a weight average molecular weight of 100,000 and prepared by copolymerization through suspension polymerization of a monomer mixture of 1.0 wt % of glycidyl methacrylate (GMA), 10 wt % of methyl acrylate and 89 wt % of methyl methacrylate.

Comparative Example 1

A highly weather resistant acrylic multilayer film was manufactured in the same manner as in Example 1 except that components and amounts thereof included in each of the upper and lower films and thicknesses of each layer were changed as listed in Table 1. In Comparative Example 1, the first functional group-containing first acrylic copolymer and the second functional group-containing second acrylic copolymer were not used.

Comparative Example 2

A highly weather resistant acrylic multilayer film was manufactured in the same manner as in Example 1 except that components and amounts thereof included in each of the upper and lower films and thicknesses of each layer were changed as listed in Table 1, and that the second functional group-containing second acrylic copolymer was prepared under the following conditions of monomers and amounts thereof. In Comparative Example 2, the first functional group-containing first acrylic copolymer was not used.

Second functional group-containing second acrylic copolymer: A copolymer having a weight average molecular weight of 100,000 and prepared by copolymerization through suspension polymerization of a monomer mixture of 1.0 wt % of glycidyl methacrylate (GMA), 10 wt % of methyl acrylate and 89 wt % of methyl methacrylate.

Comparative Example 3

A highly weather resistant acrylic multilayer film was manufactured in the same manner as in Example 1 except that components and amounts thereof included in each of the upper and lower films and thicknesses of each layer were changed as listed in Table 1, and that each of the first functional group-containing first acrylic copolymer and the second functional group-containing second acrylic copolymer was prepared under the following conditions of monomers and amounts thereof First functional group-containing first acrylic copolymer: A copolymer having a weight average molecular weight of 110,000 and prepared by copolymerization through suspension polymerization of a monomer mixture of 7 wt % of glycidyl methacrylate (GMA), 10 wt % of methyl acrylate and 83 wt % of methyl methacrylate.

Second functional group-containing second acrylic copolymer: A copolymer having a weight average molecular weight of 100,000 and prepared by copolymerization through suspension polymerization of a monomer mixture of 1.0 wt % of glycidyl methacrylate (GMA), 10 wt % of methyl acrylate and 89 wt % of methyl methacrylate.

TABLE 1

|  |  | Example 1 | Example 2 | Example 3 | Comparative Example 1 | Comparative Example 2 | Comparative Example 3 |
|---|---|---|---|---|---|---|---|
| Upper film | PVDF (wt %) | 75 | 75 | 75 | 75 | 75 | 75 |
|  | First functional group-containing first acrylic copolymer (wt %) (GMA wt %) | 25(0.5) | 25(3.0) | 25(5.0) | 25(0.0) | 25(0.0) | 25(7.5) |
| Lower film | PMMA copolymer (wt %) | 30 | 30 | 30 | 30 | 30 | 30 |
|  | Impact modifier (wt %) | 50 | 50 | 50 | 50 | 50 | 50 |
|  | Second functional group-containing second acrylic copolymer (wt %) | 20(1.0) | 20(1.0) | 20(1.0) | 20(0.0) | 20(1.0) | 20(1.0) |
|  | Other additives (phr) | 2.5 | 2.5 | 2.5 | 2.5 | 2.5 | 2.5 |
| Film thickness (μm) (Upper film/Lower film) |  | 49.2 (8.5/40.7) | 50.3 (8.0/42.3) | 49.0 (8.3/40.7) | 50.8 (8.8/42.0) | 49.6 (8.2/41.4) | 50.8 (8.6/42.2) |

Property Evaluation

Each of the highly weather resistant acrylic multilayer films manufactured in Examples 1 to 3 and Comparative Examples 1 to 3 was evaluated as to the following properties.

<Film Thickness>

Figure 2:
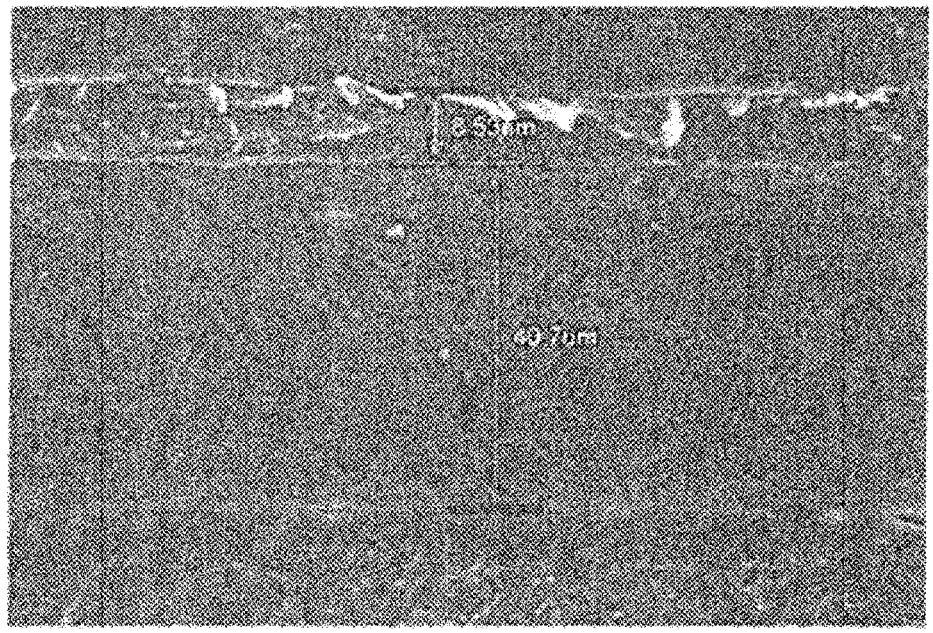
FIG. 2 is an SEM image of a highly weather resistant acrylic multilayer film manufactured in Example 1.

Each of the thicknesses as listed in Table 1 was obtained from a scanning electron microscope (SEM) image. FIG. 2 is an SEM image of the highly weather resistant acrylic multilayer film manufactured in Example 1.

<Elongation>

Elongation was measured at room temperature using a UTM (Zwick/Roell Co., Ltd.). A specimen was manufactured to a width of 10 mm and elongation of the specimen was measured at a tensile speed of 50 mm/min.

<Transmittance and Haze>

Transmittance and haze were measured in accordance with ASTM D1003 using a haze meter.

<Gel Evaluation>

A level of gel generated on a film surface was evaluated with the naked eye based on the following criteria.

◯: Number of gels of 0.1 mm or more: 5/m² or less.

X: Number of gels of 0.1 mm or more: 5/m² or more.

Evaluation results of the highly weather resistant acrylic multilayer films of Examples 1 to 3 and Comparative Examples 1 to 3 are shown in Table 2.

TABLE 2

| Property | Example 1 | Example 2 | Example 3 | Comparative Example 1 | Comparative Example 2 | Comparative Example 3 |
|---|---|---|---|---|---|---|
| Elongation (%) | 130 | 120 | 120 | 105 | 110 | 120 |
| Haze | 1.2 | 1.0 | 0.9 | 1.8 | 1.6 | 1.1 |
| Transmittance | 92 | 92 | 93 | 90 | 90 | 92 |
| Gel evaluation | ◯ | ◯ | ◯ | ◯ | ◯ | X |

From the results, it could be seen that the highly weather resistant acrylic multilayer films manufactured by coextrusion in Examples 1 to 3 exhibited excellent properties in terms of elongation, haze, transmittance and gel evaluation, as compared with those of Comparative Examples 1 to 3. These properties can allow good appearance of an exterior film and improvement in post-processability.

LIST OF REFERENCE NUMERALS

100: Highly weather resistant acrylic multilayer film
110: Upper film
120: Lower film

The invention claimed is:

1. A highly weather resistant acrylic multilayer film comprising:
   an upper film; and
   a lower film,
   wherein
   the upper film comprises polyvinylidene fluoride and a first functional group-containing first acrylic copolymer, the first functional group comprises a first epoxy group,
   the upper film comprises 60 wt % to 95 wt % of polyvinylidene fluoride and 5 wt % to 40 wt % of the first functional group-containing first acrylic copolymer,
   the lower film comprises an acrylic thermoplastic resin and a second functional group-containing second acrylic copolymer, the second functional group comprises a second epoxy group,
   the first functional group-containing first acrylic copolymer is formed by copolymerization of a first polymerizable acrylic monomer mixture comprising a first functional group-containing acrylic monomer,
   the second functional group-containing second acrylic copolymer is formed by copolymerization of a second polymerizable acrylic monomer mixture comprising a second functional group-containing acrylic monomer,
   the first and the second polymerizable acrylic monomer mixtures further independently comprise 5 wt % to 20 wt % of an acrylic monomer and 75 wt % to 94.5 wt % of a methacrylic monomer, and
   a weight average molecular weight of the first functional group-containing first acrylic copolymer ranges from 70,000 to 120,000.

2. The acrylic multilayer film according to claim 1, wherein the first functional group-containing acrylic monomer and the second functional group-containing acrylic monomer are glycidyl methacrylate.

3. The acrylic multilayer film according to claim 1, wherein the first polymerizable acrylic monomer mixture comprises 0.5 wt % to 5 wt % of the first functional group-containing acrylic monomer and the second polymerizable acrylic monomer mixture comprises 0.5 wt % to 5 wt % of the second functional group-containing acrylic monomer.

4. The acrylic multilayer film according to claim 3, wherein the first and the second polymerizable acrylic monomer mixtures independently comprise 0.5 wt % to 5.0 wt % of an epoxy methacrylate, 5 wt % to 20 wt % of methyl acrylate, and 75 wt % to 94.5 wt % of methyl methacrylate.

5. The acrylic multilayer film according to claim 1, wherein the second functional group-containing second acrylic copolymer has a weight average molecular weight of 90,000 to 150,000.

6. The acrylic multilayer film according to claim 1, wherein the lower film further comprises an impact modifier.

7. The acrylic multilayer film according to claim 6, wherein the lower film comprises 20 wt % to 50 wt % of the acrylic thermoplastic resin, 40 wt % to 60 wt % of the second functional group-containing second acrylic copolymer, and 10 wt % to 30 wt % of the impact modifier.

8. The acrylic multilayer film according to claim 6, wherein the impact modifier comprises an acrylic rubber copolymer.

9. The acrylic multilayer film according to claim 6, wherein the lower film further comprises one additive selected from the group consisting of a UV stabilizer, an antioxidant, a lubricant, and combinations thereof.

10. The acrylic multilayer film according to claim 9, wherein the lower film comprises 1.5 phr to 5 phr of the UV stabilizer.

11. A method for manufacturing the highly weather resistant acrylic multilayer film according to claim 1, comprising:
   preparing an upper film composition comprising the polyvinylidene fluoride and the first functional group-containing first acrylic copolymer;
   preparing a lower film composition comprising the acrylic thermoplastic resin and the second functional group-containing second acrylic copolymer;
   coextruding the upper film composition and the lower film composition to prepare the acrylic multilayer film having the upper film and the lower film.

* * * * *